(12) United States Patent
Esch et al.

(10) Patent No.: US 8,965,735 B2
(45) Date of Patent: Feb. 24, 2015

(54) SIGNAL PROCESSING DEVICE

(75) Inventors: Rainer Esch, Blomberg (DE); Viktor Oster, Blomberg (DE)

(73) Assignee: Phoenix Contact GmbH & Co. KG (DE)

( * ) Notice: Subject to any disclaimer, the term of this patent is extended or adjusted under 35 U.S.C. 154(b) by 825 days.

(21) Appl. No.: 12/808,044

(22) PCT Filed: Dec. 12, 2008

(86) PCT No.: PCT/EP2008/010605
§ 371 (c)(1),
(2), (4) Date: Aug. 31, 2010

(87) PCT Pub. No.: WO2009/083116
PCT Pub. Date: Jul. 9, 2009

(65) Prior Publication Data
US 2010/0318325 A1 Dec. 16, 2010

(30) Foreign Application Priority Data

Dec. 21, 2007 (DE) .......................... 10 2007 062 974

(51) Int. Cl.
*H03F 1/26* (2006.01)
*G06F 11/22* (2006.01)
*G06F 11/20* (2006.01)

(52) U.S. Cl.
CPC ........ *G06F 11/2242* (2013.01); *G06F 11/2051* (2013.01)
USPC ........................................................ 702/189

(58) Field of Classification Search
USPC ........................................................ 702/189
See application file for complete search history.

(56) References Cited

U.S. PATENT DOCUMENTS

| 3,564,506 | A | * | 2/1971 | Bee et al. ......................... 714/16 |
| 3,735,356 | A | * | 5/1973 | Yates ............................. 710/220 |
| 3,833,798 | A | * | 9/1974 | Huber et al. ..................... 714/11 |
| 4,345,324 | A | * | 8/1982 | Smitt ............................ 370/244 |
| 4,358,823 | A | | 11/1982 | McDonald et al. |
| 4,654,857 | A | * | 3/1987 | Samson et al. ............... 714/5.11 |
| 4,707,621 | A | * | 11/1987 | Arita et al. ...................... 326/11 |
| 4,974,144 | A | * | 11/1990 | Long et al. .................... 710/306 |

(Continued)

FOREIGN PATENT DOCUMENTS

| DE | 2 108 496 A1 | 9/1972 |
| EP | 1 643 323 A1 | 4/2006 |

OTHER PUBLICATIONS

German Patent Office, "German Office Action for German International Application No. 10 2007 062 974.7-31", Dated: Sep. 1, 2008, Publisher: German Patent Office, Published in: DE.

(Continued)

*Primary Examiner* — Sujoy Kundu
*Assistant Examiner* — Alvaro Fortich
(74) *Attorney, Agent, or Firm* — Kaplan Breyer Schwarz & Ottesen, LLP

(57) ABSTRACT

The invention relates to a signal processing device having a first signal processing unit (101), a second signal processing unit (103), a third signal processing unit (105), and a safety unit (107). The first signal processing unit (101) and the second signal processing unit (103) are operable in parallel for providing signal processing redundancy, and are designed to output an output signal in each case in response to an input signal. The safety unit (107) is designed to replace the first signal processing unit (101) or the second signal processing unit (103) with the third signal processing unit (105).

14 Claims, 2 Drawing Sheets

(56) References Cited

U.S. PATENT DOCUMENTS

| | | | | |
|---|---|---|---|---|
| 5,023,776 A * | 6/1991 | Gregor | 711/122 |
| 5,197,148 A * | 3/1993 | Blount et al. | 714/5.11 |
| 5,220,566 A * | 6/1993 | Ikenoue | 370/535 |
| 5,220,668 A * | 6/1993 | Bullis | 718/102 |
| 5,243,704 A * | 9/1993 | Baty et al. | 710/100 |
| 5,313,648 A * | 5/1994 | Ehlig et al. | 712/228 |
| 5,325,517 A * | 6/1994 | Baker et al. | 714/11 |
| 5,363,501 A * | 11/1994 | Pullela | 703/20 |
| 5,652,910 A * | 7/1997 | Boutaud et al. | 712/218 |
| 5,684,807 A * | 11/1997 | Bianchini et al. | 714/712 |
| 5,774,640 A * | 6/1998 | Kurio | 714/4.3 |
| 5,838,899 A | 11/1998 | Leavitt et al. | |
| 5,881,219 A * | 3/1999 | Leung et al. | 714/31 |
| 5,901,281 A * | 5/1999 | Miyao et al. | 714/11 |
| 5,970,226 A * | 10/1999 | Hoy et al. | 714/25 |
| 6,216,236 B1 * | 4/2001 | Miyao et al. | 714/11 |
| 6,240,504 B1 * | 5/2001 | Boutaud et al. | 712/38 |
| 6,263,418 B1 * | 7/2001 | Boutaud et al. | 712/38 |
| 6,311,264 B1 * | 10/2001 | Boutaud et al. | 712/38 |
| 6,314,531 B1 * | 11/2001 | Kram | 714/38.1 |
| 6,550,018 B1 * | 4/2003 | Abonamah et al. | 714/6.32 |
| 6,654,916 B1 * | 11/2003 | Furukawa | 714/724 |
| 6,732,300 B1 * | 5/2004 | Freydel | 714/36 |
| 6,823,251 B1 * | 11/2004 | Giers | 701/76 |
| 6,934,874 B2 * | 8/2005 | Retter et al. | 714/4.1 |
| 6,985,975 B1 | 1/2006 | Chamdani et al. | |
| 7,562,261 B2 * | 7/2009 | Meyer-Grafe et al. | 714/48 |
| 7,657,789 B1 * | 2/2010 | Gerber et al. | 714/25 |
| RE44,814 E * | 3/2014 | Perholtz et al. | 709/224 |
| 2001/0020281 A1 * | 9/2001 | Retter et al. | 714/4 |
| 2002/0152420 A1 | 10/2002 | Chaudhry et al. | |
| 2003/0028640 A1 * | 2/2003 | Malik | 709/226 |
| 2003/0051188 A1 * | 3/2003 | Patil | 714/4 |
| 2003/0172205 A1 * | 9/2003 | Bastian | 710/45 |
| 2004/0078740 A1 * | 4/2004 | Cook et al. | 714/718 |
| 2004/0143802 A1 * | 7/2004 | Bayraktaroglu et al. | 716/4 |
| 2004/0153813 A1 * | 8/2004 | Swoboda | 714/36 |
| 2005/0240806 A1 | 10/2005 | Bruckert et al. | |
| 2005/0278569 A1 * | 12/2005 | Srinivasan et al. | 714/25 |
| 2005/0280036 A1 * | 12/2005 | Schroeder et al. | 257/208 |
| 2006/0010352 A1 | 1/2006 | Mukherjee et al. | |
| 2006/0074618 A1 * | 4/2006 | Miller et al. | 703/13 |
| 2006/0085158 A1 * | 4/2006 | Cakiner | 702/121 |
| 2006/0253588 A1 * | 11/2006 | Gao et al. | 709/226 |
| 2006/0273809 A1 * | 12/2006 | Miller et al. | 324/754 |
| 2006/0284174 A1 * | 12/2006 | Keller et al. | 257/48 |
| 2007/0124363 A1 * | 5/2007 | Lurie et al. | 709/202 |
| 2007/0135975 A1 * | 6/2007 | Stange et al. | 701/3 |
| 2007/0168734 A1 * | 7/2007 | Vasile | 714/33 |
| 2008/0005613 A1 * | 1/2008 | Marquardt et al. | 714/7 |
| 2008/0048703 A1 * | 2/2008 | Yamaguchi | 324/763 |
| 2008/0127021 A1 * | 5/2008 | Goel et al. | 716/10 |
| 2008/0172421 A1 * | 7/2008 | Birnbaum et al. | 707/202 |
| 2009/0119054 A1 * | 5/2009 | Adachi | 702/119 |
| 2009/0119778 A1 * | 5/2009 | Bhuyan | 726/25 |
| 2009/0282302 A1 * | 11/2009 | Serrer | 714/718 |

OTHER PUBLICATIONS

Marta Comia Costa, "International Preliminary Examination Report for International Application No. PCT/EP2008/010605", Apr. 7, 2010, Publisher: European Patent Office, Published in: EP.

Marta Comia Costa, "International Search Report and Written Opinion for International Application No. PCT/EP2008/010605", May 19, 2009, Publisher: European Patent Office, Published in: EPO.

* cited by examiner

SIGNAL PROCESSING DEVICE

FIELD OF INVENTION

The present invention relates to the field of signal processing, in particular safety-relevant signal processing systems.

BACKGROUND OF THE INVENTION

With the advent of electronics in safety-related installations, it is necessary to monitor safety-relevant elements due to the increasing complexity of equipment. For this reason, German safety standard DIN EN 61508 requires provision of an appropriate level of diagnostic coverage for various safety integrity levels SIL1 through SIL4. In terms of implementation, under these requirements independent diagnostic units which allow system tests to be carried out during operation must be employed with regard to the safety-relevant elements and/or channels. It is problematic that the particular diagnostic and test units may inadvertently influence the safety-relevant elements or channels, and that detection of the absence of reactions requires a very high level of effort. In addition, diagnosis of the test units is limited, so that the elements to be tested cannot be checked for all defects. The diagnostic units typically operate using test pulses which, however, may interfere with or delay the particular process due to the influencing of time responses and sequences, so that the actual processing of the safety function may be impaired for this period of time.

Furthermore, the channels to be checked are not operational during the tests, so that the safety function is suppressed for the test period, and the redundancy must be suspended.

SUMMARY OF THE INVENTION

The object of the invention is to provide a concept by means of which redundantly designed processing elements may be checked without eliminating redundancy for the test period, and in particular without the above-mentioned reactions, influences, and delays.

The invention is based on the knowledge that safety redundancy is not impaired for the test period when the particular safety component to be checked, such as a signal processing unit, for example, is replaced, at least for the duration of the tests to be carried out, by a unit which preferably has an identical design or an identical function. It is not necessary for the units to be physically or technically identical. The units may be different but still provide the same function with a different internal structure and operating method. The concept according to the invention is therefore based on providing double redundancy, and providing safety-relevant elements at least in triplicate.

According to one aspect, the present patent application relates to a signal processing device having a first signal processing unit, a second signal processing unit, a third signal processing unit, and a safety unit which may be a diagnostic and/or test device, for example, the first signal processing unit and the second signal processing unit being operable in parallel for providing signal processing redundancy, for example, and designed to output an output signal in each case in response to an input signal, and the safety unit being designed to replace the first signal processing unit or the second signal processing unit with the third signal processing unit.

For the replacement, for example, a safety unit which itself is not necessarily designed as a test device and/or diagnostic device may be provided and appropriately functionally modified to replace a given signal processing unit with another signal processing unit. However, the signal processing device which has been freed up may then be connected to a test device and/or diagnostic device, and is thus available to this test device and/or diagnostic device for testing and/or diagnostics.

According to one embodiment, the first signal processing unit, the second signal processing unit, and the third signal processing unit are each designed to output the same output information, which may be represented by an output signal, for example, in response to the same input information, which may be represented by an input signal, for example.

However, the signals may also have different formats, so that, for example, a first input signal may be digital, a second input signal, including a second input signal which corresponds to the first input signal, may be analog, and a third input signal, including a third input signal which corresponds to the first input signal and/or to the second input signal, may be negated, etc. The safety-relevant information content may thus be identical in each case.

According to one embodiment, the safety unit is designed to replace the first signal processing unit or the second signal processing unit with the third signal processing unit when the output signals of the first signal processing unit and of the second signal processing unit are different.

According to one embodiment, the safety unit is designed to replace the first signal processing unit or the second signal processing unit with the third signal processing unit in order to check an output signal of the first signal processing unit or of the second signal processing unit in response to a test input signal.

According to one embodiment, the first signal processing unit and the second signal processing unit may be interconnected to form a redundancy block, the safety unit being designed to successively replace in each case the first signal processing unit or the second signal processing unit with the third signal processing unit, and the particular signal processing unit which is located outside the redundancy block is the third signal processing unit.

According to one embodiment, the safety unit includes a diagnostic device for checking the output signal of the particular signal processing unit in response to test input information, which may be represented by a test input signal, for example a test pattern.

According to one embodiment, the first signal processing unit and the second signal processing unit are connected in parallel.

According to one embodiment, the first or the second signal processing unit is designed to monitor the output signal of the second or of the first signal processing unit, respectively.

According to one embodiment, the signal processing device also includes a signal evaluation unit which is designed to output only the output information, i.e., the output signal, of the first signal processing unit or of the second signal processing unit when the output information, i.e., the output signals, of the first and second signal evaluation units is identical.

According to one embodiment, the safety unit also includes a switching unit for switching off the first or the second signal processing unit and for switching on the third signal processing unit.

According to one aspect, the invention relates to an integrated signal processing element having the signal processing device according to the invention.

According to one aspect, the invention relates to an electronic system comprising the signal processing device according to the invention, a signal bus, and an interface unit for supplying the signal bus with the output signal of the first signal processing unit and/or of the second signal processing unit. The interface unit may also be modified to form a single output signal from the two output signals.

According to one aspect, the invention relates to a signal processing method comprising the steps of processing input information, which may be represented by an input signal, by a first signal processing unit and by a second signal processing unit in order to provide signal processing redundancy, and replacing the first signal processing unit or the second signal processing unit with a third signal processing unit by use of a safety unit, which may be a diagnostic and/or test device, for example.

BRIEF DESCRIPTION OF THE DRAWINGS

Further exemplary embodiments are explained with reference to the accompanying figures, which show the following.

DETAILED DESCRIPTION

Figure 1:
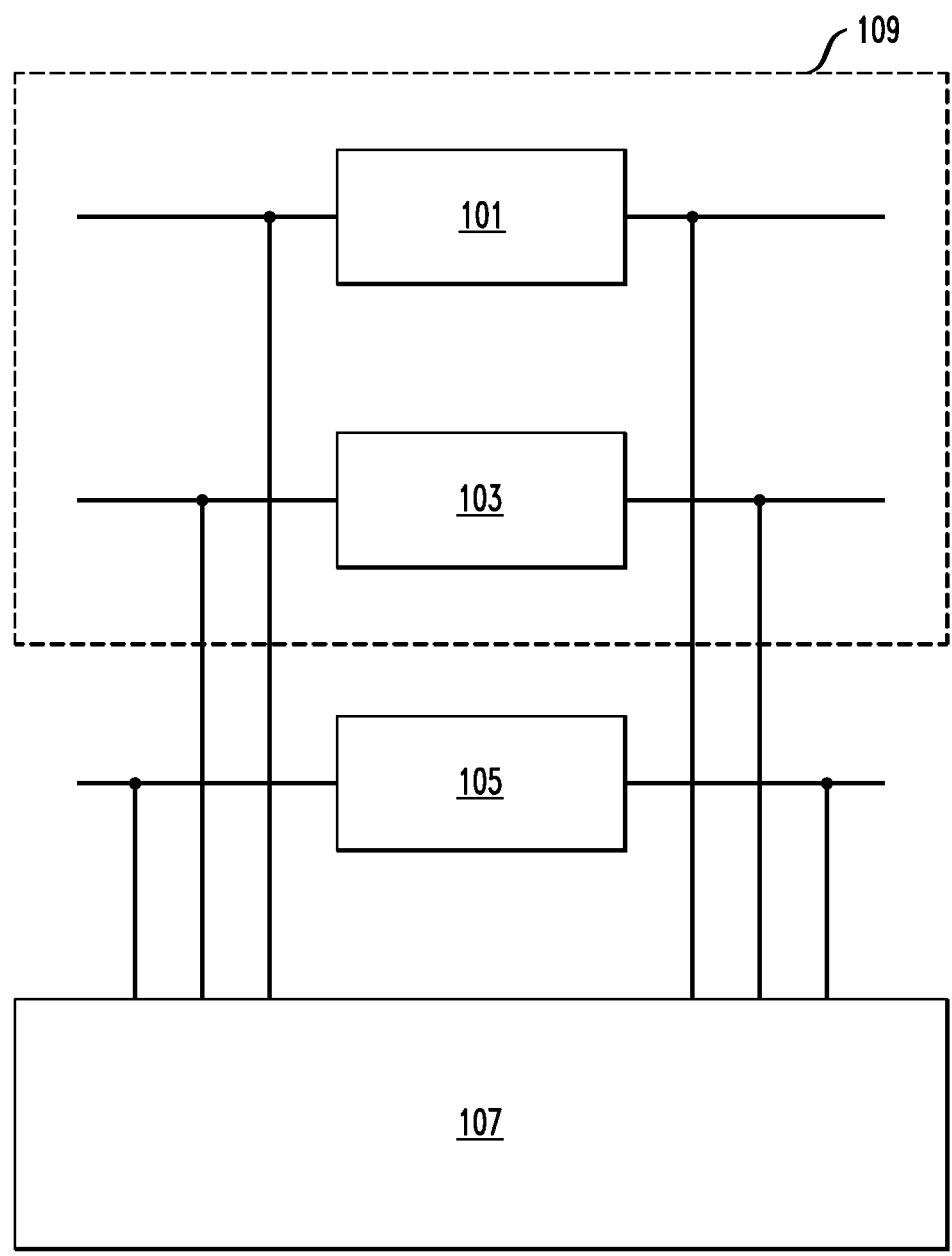
FIG. 1 shows a signal processing device according to one embodiment.

The signal processing device illustrated in FIG. 1 includes a first signal processing unit 101, a second signal processing unit 103 which is situated in parallel with the first signal processing unit 101, and a third signal processing unit 105. The signal processing device also includes a safety unit 107 which is connected to the inputs and the outputs of signal processing units 101, 103, and 105. Signal processing units 101 and 103 are combined to form a redundancy block 109, and are preferably connected in parallel and provided with identical designs. It is noted, however, that the signal processing units may also be signal processing units having various designs. Therefore, during proper operation of both signal processing units 101 and 103, in each case the same or mutually corresponding output signal is expected in response to the same or mutually corresponding input signal. It is noted that the identical or mutually corresponding signals may also have different formats, and may therefore be present in digital, analog, or negated form, for example. On the other hand, if the outputs of signal processing units 101 and 103 differ from one another, safety unit 107 may replace one of the signal processing units 101 or 103 situated in redundancy block 109 with the third signal processing unit 105, which is designed as additional redundancy, by switching over, for example.

The switchover may be carried out using electronic switches, for example, which remove the particular channel, i.e., the particular signal processing unit, from the redundancy block, i.e., the safety chain 109, and at the same time integrate the other channel, i.e., the third processing unit 105, into the safety chain 109. The switching time of the switching electronics is preferably as brief as possible so that the overall functioning of the signal processing device is not influenced.

During operation, for example the particular signal processing unit, i.e., the particular channel, to be integrated may first be supplied with the current input values, at which point the switchover, for example as previously described, may take place. This allows channels 101, 103, and 105 to be successively tested without impairing the redundancy. In addition, for example both channels 101 and 103 may be operated in parallel for a specifiable period of time, and may independently deliver results which may be matched at the output, for example. If the particular incorporated channel is fully operable and has the current input values, the switchover may be carried out as described above.

Signal processing units 101, 103, and 105 may be designed to carry out any given signal processing functionalities, and may each have a plurality of integrated components. The signal processing units may, for example, form and/or provide safety-relevant processing channels for decoding, encoding, processing using cryptographic methods, filtering, or amplifying the input signals.

The safety unit 107 may be designed as a diagnostic or test unit, for example, and may be implemented using a microcontroller or a simple state machine which, for example, is precisely adapted to the safety function. The safety unit 107 as well as signal processing units 101, 103, and 105 may be digital or analog units.

According to one embodiment, signal processing units 101, 103, and 105 have a safety function, for example. For checking the safety function, units 101 and 103 may be fed or supplied with specifiable input variables, and the particular specifiable output variables may be compared, for example, to previously determined values or to reference values, for example using the safety unit 107 or a comparator provided therein. The functionality of the particular channel 101 or 103 may be checked by comparing the data.

To achieve a high level of diagnostic coverage, predetermined input patterns may be used as input variables, and may be generated, for example, by a permutation of a bit pattern.

According to one embodiment, signal processing units 101, 103, and 105 may have further interfaces which may be supplied with additional test signals in order to achieve even greater diagnostic coverage.

If, for example, signal processing units 101 and 103 are provided for detecting two input signals, filtering the input signals for a specifiable filtering time, and then linking the signals using the "AND" operation, the filtering effect of the particular channel may be checked by supplying input signals having different 0 and 1 sequences. For example, short signal sequences composed of two or three bits, for example, may be supplied which must then be executed. Longer signal sequences which are not permitted to filter out the filtering function may also be used. In order to fully check the "AND" operation, the sequences 00, 01, 10, and 11 may be supplied at the input side as input states. Longer bit sequences may be provided for more complex systems.

Figure 2:
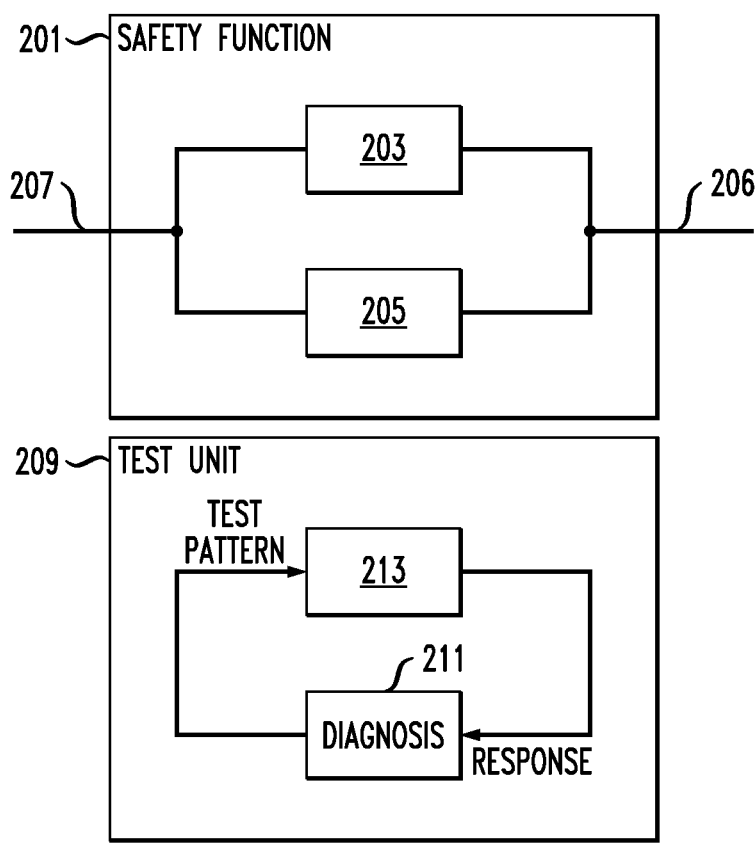
FIG. 2 shows a signal processing device according to a further embodiment.

FIG. 2 shows a signal processing device according to a further embodiment. The signal processing device includes a redundancy block 201 having a first signal processing unit 203 and a second signal processing unit 205. Signal processing units 203 and 205 are connected in parallel, so that the redundancy block 201 has an input 206 and an output 207.

The signal processing device also includes a safety unit 209 having a diagnostic unit 211 and a third signal processing unit 213. The diagnostic unit 211 and the third signal processing unit 213 form a test unit, whereby the diagnostic unit 211 supplies the third signal processing unit 213 with a test pattern and evaluates a response signal of the third signal processing unit. If the response signal corresponds to the expected response signal for the particular test pattern, the functionality of the third signal processing unit is classified as correct. Either the first or the second signal processing unit 203 or 205, respectively, is then replaced with the third signal processing unit 213 and checked as described above.

Signal processing units 203 and 207, which may be considered as channels, and which are combined to form the redundancy block 201, are situated in the safety chain of the redundancy block 201 illustrated in FIG. 2 during run time, and are responsible for carrying out the particular safety function. The free channel 213, which at this point in time is not involved with the safety function, is in testing. As soon as the test is completed, the tested channel is incorporated into the safety chain, and a freed-up channel is removed from the safety chain and connected to the diagnostic unit 211 for test purposes. When this unit has also been completely tested, another switchover is carried out in which the third channel is connected to the testing environment. This procedure has the advantage that during the test the particular channel to be tested is not present in the safety chain. In addition, in this manner the complete spectrum of test patterns may be applied to the channel to be tested, thus allowing a 100% testing depth to be achieved. The test patterns may be taken from the development process, thus reducing the level of effort for developing the diagnostic unit 211. The test pulses of the test patterns do not impair the safety function, since the channel to be tested is not present in the safety chain of the redundancy block 201 during the test. Since only one diagnostic unit 211 is required, cost-effective implementation is possible in which a plurality of signal processing units (channels) may be checked. In addition, better quantification results may be obtained on account of the achievable testing depth.

The signal processing devices illustrated in FIGS. 1 and 2 may be implemented using application-specific integrated circuits (ASICs) or field-programmable gate arrays (FPGAs). The design of the signal processing units (channels) may be the same or different, whereby a single diagnostic unit is preferably required for checking the plurality of signal processing units.

What is claimed is:

1. A signal processing device, comprising:
   a first signal processing unit;
   a second signal processing unit;
   a third signal processing unit, wherein each signal processing unit is designed to output mutually corresponding output signals in response to mutually corresponding input signals; and
   a safety unit;
   wherein the first signal processing unit and the second signal processing unit are operable in parallel for providing signal processing redundancy and are interconnectable to form a redundancy block;
   wherein the first signal processing unit, the second signal processing unit, and the third signal processing unit are connected to the safety unit while the third signal processing unit is in testing;
   wherein the third signal processing unit, when connected to the safety unit during the testing, is located outside of a safety chain of the first signal processing unit and the second signal processing unit;
   wherein the safety unit is designed to successively replace in each case the first signal processing unit or the second signal processing unit with the third signal processing unit in order to perform checking of an output response signal of the particular freed-up signal processing unit with respect to a reference value in response to a test input signal according to a predetermined test pattern, wherein the checking uses at least one of i) a test device and ii) a diagnostic device; and
   wherein the particular freed-up signal processing unit becomes the third signal processing unit and if the output response signal of the third signal processing unit corresponds to the expected response signal for the predetermined test pattern, the functionality of the third signal processing unit is classified as correct and either the first signal processing unit or the second signal processing unit is then replaced with the third signal processing unit.

2. The signal processing device according to claim 1, wherein the first signal processing unit, the second signal processing unit, and the third signal processing unit are safety-relevant processing channels that have a safety function, and
   wherein only the first signal processing unit and the second signal processing unit are located in the safety chain and carry out the particular safety function.

3. The signal processing device according to claim 1, wherein the safety unit comprises a diagnostic device for checking the output signal of the particular signal processing unit in response to a test input signal.

4. The signal processing device according to claim 1, wherein the first signal processing unit and the second signal processing unit are connected in parallel.

5. The signal processing device according to claim 1, wherein at least one of the first and the second signal processing unit is designed to monitor the output signal of the second and of the first signal processing unit, respectively.

6. The signal processing device according to claim 1, further comprising a signal evaluation unit which is designed to output only the output signal of at least one of the first signal processing unit and of the second signal processing unit when the output signals of the first and the second signal evaluation units are at least one of identical to one another and corresponding to one another.

7. The signal processing device according to claim 1, wherein the safety unit further comprises a switching unit (i) for switching off at least one of the first and the second signal processing unit and (ii) for switching on the third signal processing unit.

8. An integrated signal processing element comprising the signal processing device according to claim 1.

9. An electronic system, comprising:
   the signal processing device according to claim 1;
   a signal bus; and
   an interface unit for supplying the signal bus with the output signal of at least one of the first signal processing unit and the second signal processing unit.

10. A signal processing method implemented using the signal processing device according to claim 1, the method comprising:
    processing an input signal by the first signal processing unit and by the second signal processing unit in order to provide signal processing redundancy;
    replacing the first signal processing unit or the second signal processing unit with the third signal processing unit, using the safety unit; and
    checking an output response signal of the particular freed-up signal processing unit with respect to a reference value in response to a test input signal according to a predetermined test pattern, using the safety unit, wherein the checking uses at least one of i) a test device and ii) a diagnostic device; and
    wherein the particular freed-up signal processing unit becomes the third processing unit and if the output response signal of the third signal processing unit corresponds to the expected response signal for the predetermined test pattern, the functionality of the third signal processing unit is classified as correct and either the first signal processing unit or the second signal processing unit is then replaced with the third signal processing unit.

11. A signal processing device, comprising:
a first signal processing unit;
a second signal processing unit;
a third signal processing unit, wherein each signal processing unit is designed to output mutually corresponding output signals in response to mutually corresponding input signals; and
a safety unit;
wherein the first signal processing unit and the second signal processing unit are connected in parallel for providing signal processing redundancy and are connected to form a redundancy block;
wherein the safety unit comprises a diagnostic unit and the third signal processing unit, wherein the diagnostic unit is designed to supply the third signal processing unit with a predetermined test pattern and to evaluate a response signal of the third signal processing unit;
wherein the first signal processing unit, the second signal processing unit, and the third signal processing unit are safety-relevant processing channels that have a safety function, and wherein only the first signal processing unit and the second signal processing unit are located in a safety chain and carry out the particular safety function;
wherein the first signal processing unit, the second signal processing unit, and the third signal processing unit are connected to the safety unit while the third signal processing unit is in testing;
wherein the third signal processing unit, when connected to the safety unit during the testing, is located outside of the safety chain of the first signal processing unit and the second signal processing unit;
wherein the safety unit is designed to successively replace in each case the first signal processing unit or the second signal processing unit with the third signal processing unit in order to perform checking of an output response signal of the particular freed-up signal processing unit with respect to a reference value in response to a test input signal according to the predetermined test pattern; and
wherein the particular freed-up signal processing unit becomes the third signal processing unit and if the output response signal of the third signal processing unit corresponds to the expected response signal for the predetermined test pattern, the functionality of the third signal processing unit is classified as correct and either the first signal processing unit or the second signal processing unit is then replaced with the tested third signal processing unit as soon as the test is completed.

12. An integrated signal processing element comprising the signal processing device according to claim 11.

13. An electronic system, comprising:
the signal processing device according to claim 11;
a signal bus; and
an interface unit for supplying the signal bus with the output signal of at least one of the first signal processing unit and the second signal processing unit.

14. A signal processing method implemented using the signal processing device according to claim 11, the method comprising:
processing an input signal by the first signal processing unit and by the second signal processing unit in order to provide signal processing redundancy;
replacing the first signal processing unit or the second signal processing unit with the third signal processing unit, using the safety unit; and
checking an output response signal of the particular freed-up signal processing unit with respect to a reference value in response to a test input signal according to a predetermined test pattern, using the safety unit;
wherein the particular freed-up signal processing unit becomes the third processing unit and if the output response signal of the third signal processing unit corresponds to the expected response signal for the predetermined test pattern, the functionality of the third signal processing unit is classified as correct and either the first signal processing unit or the second signal processing unit is then replaced with the tested third signal processing unit as soon as the test is completed.

* * * * *